United States Patent
Coulmeau et al.

(10) Patent No.: US 9,805,606 B2
(45) Date of Patent: Oct. 31, 2017

(54) MAN-MACHINE INTERFACE FOR THE MANAGEMENT OF THE TRAJECTORY OF AN AIRCRAFT

(71) Applicant: THALES, Courbevoie (FR)

(72) Inventors: François Coulmeau, Toulouse (FR); Frédéric Bonamy, Pessac (FR); Vincent Savarit, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/848,061

(22) Filed: Sep. 8, 2015

(65) Prior Publication Data
US 2016/0078770 A1    Mar. 17, 2016

(30) Foreign Application Priority Data
Sep. 12, 2014    (FR) .................... 14 02036

(51) Int. Cl.
*G08G 5/00* (2006.01)
*G06F 3/0484* (2013.01)
*G06F 3/0488* (2013.01)

(52) U.S. Cl.
CPC ....... *G08G 5/0039* (2013.01); *G06F 3/04845* (2013.01); *G06F 3/04847* (2013.01); *G06F 3/04883* (2013.01); *G08G 5/0021* (2013.01); *G08G 5/0034* (2013.01)

(58) Field of Classification Search
None
See application file for complete search history.

(56) References Cited

U.S. PATENT DOCUMENTS

| | | |
|---|---|---|
| 2009/0319100 A1 | 12/2009 | Kale et al. |
| 2011/0199239 A1 | 8/2011 | Lutz et al. |
| 2013/0345905 A1 | 12/2013 | Parthasarathy |
| 2014/0074323 A1 | 3/2014 | Andre et al. |

*Primary Examiner* — Krishnan Ramesh
(74) *Attorney, Agent, or Firm* — Baker Hostetler LLP

(57) ABSTRACT

A method of graphical manipulation of the trajectory of an aircraft comprises the steps of receiving an indication of a deformation point associated with the trajectory of the aircraft; determining a zone of local modification of the trajectory of the aircraft as a function of the deformation point; computing a modified trajectory and graphically restoring the modified trajectory. A parameter associated with the indication of the deformation point, notably a speed and/or acceleration value (for example of the contact point on the touch-sensitive interface, or else of a cursor), is received or determined. A modified trajectory is computed by selecting a computation algorithm from among a plurality of faster or slower predefined algorithms; the selection being performed as a function of the parameter. Various other developments are described (configurable selection, trajectory modification bounds, processing of an arbitrary deformation point, i.e. one other than a point of the flight plan, etc.).

13 Claims, 5 Drawing Sheets

MAN-MACHINE INTERFACE FOR THE MANAGEMENT OF THE TRAJECTORY OF AN AIRCRAFT

CROSS-REFERENCE TO RELATED APPLICATION

This application claims priority to foreign French patent application No. FR 1402036, filed on Sep. 12, 2014, the disclosure of which is incorporated by reference in its entirety.

FIELD OF THE INVENTION

The invention relates to techniques of man-machine interaction in the flight cabin of an aircraft and details in particular an interactive touch-sensitive piloting interface for an onboard real-time flight management system (FMS).

BACKGROUND

On aircraft of the A320, A330, A340, B737/747 generation, the construction of the flight plan is done by means of a display screen which is not interactive and from an alphanumeric keyboard on a so-called MCDU (Multi Purpose Control Display) interface. This process is tedious and inaccurate.

On more recent aircraft (A380, A350, B777, B787) and on business aircraft (Falcon for example), pointing devices have been introduced but the creation of trajectories by progressive insertion of flight points (or "waypoints") remains laborious and limited.

On a few yet more recent aircraft, interactive or touch-sensitive screens allow the pilot to define or modify a trajectory, termed a "stick", which consists of a drawing of the desired trajectory. The pilot receives, after computation by the onboard computer, a validated—but modified—trajectory which may be very different from the desired trajectory, on account of the consideration of the flight constraints.

The progressive insertion of waypoints is still called for, i.e. an arbitrary trajectory cannot be manipulated by the pilot, thus culminating in rather inflexible solutions. Patent application US2009319100 discloses systems and methods for defining and representing a trajectory. However, the application does not deal with certain aspects, for example relating to the real-time tracking or to the manipulation of an arbitrary trajectory. Furthermore, the model of interaction with the FMS onboard computer presents limitations. In particular, much "toing and froing" or "trial and error" may be required in order to finalize a trajectory. The definition and the management of "allowed modifications" does not afford a satisfactory solution.

In all the typical cases set forth previously, the computation time representative of a complete trajectory by an FMS takes between 2 and 10 seconds. Thus, on each addition of a point to the flight plan, the crew must wait to view the corresponding final trajectory, such as validated by the avionics systems.

This time lag occurring between the instant of the formulation of the desires regarding trajectory—or regarding change of trajectory—and the trajectory validation by the onboard computer gives rise to numerous limitations and drawbacks (e.g. delays, sluggishness, inflexibility). Employing pointers (e.g. mice) or touch-sensitive interfaces renders the response waiting times yet more problematic. Per se, the repetition of tedious operations may give rise to cognitive overload of the pilot, prejudicial to his fatigue and therefore to flight safety. In certain situations, the inflexibility of existing systems may go so far as to discourage changes of trajectory from being made.

There exists in the industry a need for advanced processes and systems for the definition and management of flight trajectories within the equipment present in the flight cabin of an aircraft (or of the cabin for remote-piloting of a drone).

SUMMARY OF THE INVENTION

There is disclosed a method for the graphical manipulation of a trajectory of an aircraft comprising the steps of receiving an indication of a deformation point associated with the trajectory of the aircraft; determining a zone of local modification of the trajectory of the aircraft as a function of the said deformation point; computing a modified trajectory and graphically restoring the said modified trajectory.

A trajectory is selected from among several (e.g. current trajectory or revised or candidate trajectory etc.), for example by the pilot or provided automatically (e.g. based on rules). A point is determined or selected or indicated, for example by the provision of the spatial coordinates of this point (in space or on the display screen). The deformation point is associated with the trajectory: the point can belong to the trajectory (i.e. be a point of the flight plan or not, that is to say an arbitrary point of the trajectory) or else be connected with the trajectory (cf. for example the "attractor" points hereinafter). In one embodiment, one single deformation point is indicated. In another embodiment, a plurality of deformation points are indicated. On the basis of this or of these points a zone of local modification of the trajectory is determined. In one embodiment modification bounds (initial, terminal) are defined, the remainder of the trajectory remaining for example unchanged. The associated advantage resides in the calculability of the global trajectory thus made possible by the isolation of a trajectory sub-part to be modified. In one embodiment, the trajectory is computed by the FMS avionics system (that is to say a certified and regulated computer, integrating all the aeronautical flight constraints and specifications). In one embodiment, the intermediate trajectory portion defined on the basis of the deformation point is computed according to "local" algorithms, which may be predefined, i.e. which guarantee the stability of the global trajectory, once the global subsequent revision has been validated by the FMS. Stated otherwise, mathematical computations intentionally simplified to react in a few milliseconds may be used. The intermediate trajectory portion defined on the basis of the deformation point is computed in real time or quasi-real time. By "real-time" is meant a trajectory management which can be performed in short response times with respect to the manipulation of the trajectory on the graphical interface (touch-sensitive or other).

In a development, the method furthermore comprises a step of receiving or determining a parameter associated with the indication of the deformation point.

For example, the associated parameter can correspond to the measurement of a speed of displacement of the pilot's finger on the touch-sensitive interface (in this case the parameter is determined or measured). A numerical value can also be (directly or indirectly) received for example by voice command or by touch-sensitive command or by logical command or by network command or by physical thumbwheel or by mouse cursor or by movement of the eyes (e.g. "eye tracking").

The numerical value thus determined (by computation or received) can be interpreted (for example) as an intensity influencing the degree or the modalities of deformation of the trajectory. For example, a dangerous meteorological event will be designated on the screen and associated with an extreme danger value, leading to a recomputation of the trajectory considered (for example sidestepping the said event by as far as possible).

In a development, the step of computing a modified trajectory comprises a step of selecting a computation algorithm from among a plurality of predefined algorithms, the said selection being performed as a function of the parameter associated with the indication of the deformation point. The predefined algorithms may exhibit different execution speeds (known beforehand).

In a development, the parameter associated with the indication of the deformation point is a speed and/or an acceleration (for example of the finger on the touch-sensitive interface or of the cursor).

Stated otherwise, the method according to the invention links (or associates) the behaviour detected on the touch-sensitive interface and the type of algorithms (faster or slower) implemented to determine the valid (or verified) trajectory. The speed and/or the acceleration of the physical contact on the touch-sensitive interface (or of the cursor), according to an interpretation of the model, can express the eagerness (or the constraint or else the requirement) as regards the speediness of display and/or of accuracy as regards the graphical restoration of the modified and validated trajectory. This detection via the man-machine interface is thereby linked or associated with the selection of the most appropriate computation algorithm for satisfying the previous constraints (i.e. for achieving a satisfactory compromise between the requirement regarding display speed and the requirement regarding accuracy or realism of the validated trajectory).

Consideration of the acceleration detected on the touch-sensitive interface may make it possible to express which trajectory portions are the most important. The (speed, acceleration) pair interpreted by a model may convey the pilot's intentions and the level of speed/realism compromise to be achieved. A trajectory portion may be drawn carefully and therefore slowly (conveying a possible imperative of reliability of the display that has to be performed) while the end of the said drawing may be performed more briskly, thus leading to a preference for fast display. Other models are nonetheless possible.

The link established between the behaviour analysed at the interface and the mode of validation of the trajectories can be simple or complex. It can assume numerous forms in practice. A simple link or association of the interface/algorithms relationship may be made for example by means of a table, i.e. according to static correspondences. Conversely a complex association can comprise dynamic, changeable correspondences, e.g. dynamic heuristics and/or more numerous and/or intermediate predefined algorithms and/or machine based learning processes and/or the consideration of the flight context or of complementary criteria such as the stress level measured in the flight cabin for example by measuring the sound surroundings, the criticality of the flight phase in progress. For example, slower and more accurate algorithms may be favoured when cruising, while the same commands received during a critical flight phase will favour the use of the fastest algorithms by default. The techniques employed may comprise the employing of invariant or dynamic matrices or tables, charts, weightings, percentages and even the use of neural network based or fuzzy logic systems.

In order to remedy possible drifts or instabilities of this type of regulation, the present mechanism for adapting the interaction at the interface and/or its adaptive mechanisms can be deactivated on command (for example, the interpretation algorithms or their equivalents can be deactivated so as to avoid the dysfunctional and/or superfluous intermediate levels between the pilot's instructions and the actual flight commands, i.e. at the start and end of the chain). The mode of interaction—active at the interface—can also be controlled from this same interface: in an embodiment, the pilot can force this or that "mode of interaction" (in the sense of an "interface behaviour/computation algorithms" compromise), i.e. by fixing for example by himself priority to the speed of display feedback or to the forecast/realism of display of the modified trajectory; or else by weighting the importance of each respective factor. Stated otherwise, the global behaviour of the interface can change over time, be configurable by the pilot, the aircraft manufacturer or the airline, etc.

In a particular embodiment, the computations can be performed by fast local trajectory computation algorithms optimized as a function of the speed of displacement of the deformation point, for example on the graphical touch-sensitive interface (e.g. mean or instantaneous speed of the finger on the touch-sensitive interface, or of a cursor, for example mouse or joystick cursor). The derivative of the speed can also be taken into account, in a complementary manner ("and") or in substitution ("or").

In one embodiment, the modes of computation match the type of interaction exerted, i.e. such as captured by the interface means. For example, the faster the displacement on a touch-sensitive interface, the more favoured the use of an algorithm whose execution is known to be fast. Indeed, there may be deduced an acceptable waiting lag as a function of the way in which the deformation command has been received (faster or slower movement on the touchscreen and/or rate of speech and/or emotions detected in the voice, etc.). The tracking of the interaction can comprise accelerations, pauses or resumptions which are so many criteria indicating which computation compromises must be made. In an emergency trajectory evaluation situation, fairly summary or approximate computations may be acceptable. In the converse case where the trajectory is drawn carefully (therefore at low speed), more accurate and therefore more time-consuming computations may be implemented.

Embodiments which anticipate deformation commands or requests, for the purpose of reducing the latency time necessary for the trajectory computation, are also disclosed. In particular, a so-called "prefetch" embodiment (described hereinafter) can anticipate and/or pre-compute the possible trajectory modifications (so as to improve the response times). Points of attraction or repulsion can also modulate the trajectory deformations, in a static or dynamic manner.

In a development, the step of determining the zone of local modification of the trajectory comprises a step of determining bounds of start and end of modification of the trajectory.

This development makes explicit that the deformation is circumscribed in space, in such a way as to simplify the computations. The associated advantage resides in the calculability of the global trajectory thus allowed by the isolation of a trajectory sub-part to be modified.

In a development, the modified local trajectory is displayed after its recomputation by the selected algorithm.

In one embodiment, the trajectory is visualized immediately, for example in tandem with the displacement of the finger and/or pointers (or cursors) on the display screen. The flight plan is constructed progressively and iteratively, i.e. "gradually" (e.g. by successive and progressive insertion). The corresponding trajectory is computed and displayed immediately. The pilot can therefore rewind or evaluate the possible trajectories with more "depth of view" than with the existing systems. The local recomputations make it possible to avoid the global recomputation associated with one of the nestings of interdependent loops.

In a development, the selection of the computation algorithm is configurable.

For example, the airline can predefine the employment of particular algorithms, for example as a function of the flight context. The so-called "normal" algorithm can be selected by default. The configuration of the algorithms (as regards their employment and/or their content) can include preferences declared by the pilot, parameters defined automatically, directives given by the airline, ATC instructions etc.

In one embodiment, a predefined algorithm comprises a turning radius which is constant or equal to (Average Ground Speed)$^2$/(g*))Tan(25°)), where g is the gravitational constant.

In one embodiment, a predefined algorithm comprises turning radii i equal to (Ground speed at the point i)$^2$/(g*)Tan(alpha°), where the angle alpha is the aircraft roll, which is dependent on the altitude, on the speed and on the engine state of the aircraft and the points i being determined intermediate points on the modified local trajectory.

In one embodiment, a predefined algorithm comprises the algorithm for complete computation by the FMS flight computer.

In one embodiment, the trajectory represented "under the finger" of the pilot is continuously validated by the FMS, avoiding any disparity between the desired trajectory and the valid final trajectory. The visual rendition follows the movement of the finger on the graphical interface.

In a development, the method furthermore comprises a step of receiving an indication of a final deformation point. The final deformation point can be determined as such in various ways. It can be declared as such (e.g. input at the keyboard, voice command, switch, etc.). It can also be verified (for example if the pilot's finger is still in contact with the touchscreen and/or if it is still moving on the said interface (e.g. according to displacement thresholds or percentage etc.) and/or if it is no longer moving etc.).

In a development, the method furthermore comprises a step of revising the flight plan by adding the final deformation point to the flight plan.

On the contrary, still for example, the pilot can cancel a revision by bringing the deformation point back onto the current trajectory (the method can conclude that there is no longer any deformation and can cancel the revision). If the finger is raised up although the initial and final deformation points do not correspond, it can be considered that the deformation has terminated, and the method can finalize the computations. In one embodiment, it is possible to increase the graphical accuracy associated with the deformation points, for example to shift a point more finely by short presses alongside the (initial or final) deformation point. Other associated options comprise notably an option of recentring the display on the selected point.

In a development, the initial deformation point is not a flight plan point.

There is disclosed a computer program product, comprising code instructions making it possible to perform the steps of the method according to any one of the steps of the method, when the said program is executed on a computer.

There is also disclosed a system comprising means for implementing one or more steps of the method.

In a development, the system comprises one or more touch-sensitive interfaces present on an FMS flight computer and/or one or more electronic flight bags EFB and/or one or more display screens CDS.

The method can be implemented on different physical systems (for example by one or more presses on a touch-sensitive interface and/or by indication of a pointing device, such as a mouse cursor or a dataglove and/or voice commands, etc.). For example the deformation point can be indicated by a point of pressing (and/or of pressure) on a touch-sensitive interface or by indication of a pointing device. The coordinates of the deformation point or points can be 2D (e.g. vertical profile or navigation) or even 3D (e.g. in space, by manipulation of spherical coordinates or volumes etc.). The coordinates can be received in a continuous manner (or at least in a sequential manner).

Computation means (i.e. computation capabilities) can be offloaded onto surrounding/onboard electronic flight bags and therefore the computation times can be (yet further) reduced.

In a development, the system comprises a navigation display ND screen and/or a vertical evolution display screen VD.

In a development, the system comprises means of virtual and/or augmented reality.

Advantageously according to one embodiment of the method, it is possible to construct a trajectory, computed rapidly by the FMS, "with the finger" on the touchscreen, or with a pointing device (CCD for "Cursor Control Device") on any type of screen. In the case of an interactive man-machine interface (for example, with a cursor displaced by a mouse for example), the trajectory displayed during the displacement of the mouse corresponds (at least substantially) to the actual trajectory of the flight management computer.

In one embodiment, the method comprises the computation of a local trajectory, arising from a complete trajectory. When an action is determined on a flight plan element or a piece of the trajectory, the method determines a local modification zone around the element: it deduces therefrom two bounds of 'start of modification' and of 'end of modification'. Next it retrieves the information at the bounds (predictions notably). As and when the trajectory is deformed, a simple local trajectory update algorithm is launched. The latter uses simplified mathematical computations so as to be able to react in a few milliseconds. For the undeformed parts, an algorithm for updating the predictions can be performed, by applying the prediction deltas arising from the deformed trajectory to the predictions of the points.

Advantageously, the invention allows interactive construction of trajectories by onboard systems. The toing and froing between the pilot's wishes and the feedback of the computer as regards the possibilities for change of trajectory are closer together in time, so that genuine interactive trajectory construction becomes possible. The pilot can generally evaluate alternative trajectory solutions immediately and at any moment. This increased flexibility may for example allow fuel savings or greater reactivity with respect to external flight events, such as sudden local meteorological changes.

Advantageously, the pilot can rapidly see his actions, in tandem with the displacement of his finger.

Advantageously, by deploying the ability to interactively construct trajectories on touchscreen, the pilot can decrease his cognitive load, by being unburdened of tedious verificatory checks, and can concentrate more on actual piloting.

Advantageously, the trajectory in the course of modification follows in real time the finger on the screen.

Advantageously according to the invention, the trajectory represented under the finger of the pilot is continuously validated by the FMS, avoiding any disparity between the desired trajectory and the valid final trajectory.

Advantageously according to the invention, "real-time" tracking of the final trajectory of an onboard system is allowed. Stated otherwise, the trajectory management can be performed in short response times with respect to the manipulation of the interface.

The solution afforded to the problem of the existing shift between the desired trajectory and the trajectory ultimately validated by the FMS (and its various aspects, notably temporal) consists notably in computing an intermediate portion of trajectory in real time or quasi-real time, according to "local" algorithms, while guaranteeing the stability of the global trajectory, once the revision has been validated.

According to one aspect, and in a particular embodiment, the trajectory algorithms called during the displacement of the finger on the interface are dependent on the speed of displacement of the finger. The faster the displacement on the touch-sensitive interface, the more favoured the use of an algorithm whose execution is known to be fast. The advantage of this embodiment is that, as soon as the finger slows down to focus on the place that it will validate, an algorithm known to be more efficacious will be used. Accordingly, the trajectory drawn will have a still more faithful rendition.

Moreover, in contradistinction to the FMSs available on the market which compute a lateral trajectory based on the points of the flight plan, the method according to the invention can determine a trajectory independently of the flight plan, since the creation of a flight plan point during the displacement remains optional.

Finally, to guarantee fast response times, the method relies on "local" computations, with posterior integration into the global trajectory, which FMS flight computers available on the market do not generally do.

Advantageously, a fluid interaction is allowed. The result of the interactions effected on the trajectory is immediately visualized, in tandem with the displacement of the finger and/or pointers.

Advantageously, embodiments are directly utilizable on cursor-based interactivity systems in current aircraft.

Advantageously according to the invention, it is possible to construct a trajectory "in real time" and "gradually" (e.g. by successive insertion of points). The flight plan is constructed progressively and iteratively. The corresponding trajectory is computed and displayed immediately. The pilot can therefore rewind or evaluate the possible trajectories with more depth of view than with the existing systems.

In one embodiment, the solution can exploit the advantages inherited from the employing of touch-sensitive interfaces: drawing the trajectory of the aircraft directly (since the display will be done in real time), without involving a successive definition of flight plan points, for example by sliding the finger over a touchscreen. Among other resulting advantages, this solution makes it possible not to overload the navigation databases, which store the points of the flight plan, including the points created by the pilot.

In one embodiment, the solution can also be used in a so-called "Vertical Display" context (which is the counterpart of ND on the vertical plane), with possibility of real-time deformation of the vertical trajectory, namely the displacement of characteristic points of the flight and commonly called "pseudos waypoints" in the avionics literature of flight management systems (standardized at the worldwide level by AEEC ARINC 702), the displacement of altitude and/or speed constraints or of time constraints.

In one embodiment, the solution allows particular interactions, such as for example the abutting of two elements or else an instantaneous "DIRECT TO" function. Starting from an initial trajectory between 2 points A and B, the abutting of 2 elements can, for example, be performed by "dragging" (with the finger or the cursor) the said trajectory until it reaches another point C of the screen, this operation creating a sequence of points A, B and C. Likewise, starting from a sequence of points A, B and C comprising a trajectory segment between A and B and a trajectory segment between B and C, an abutting of A towards C can be performed by dragging the trajectory [A,B] so as to reach the point C. Stated otherwise, starting from an initial point on the interface, it is possible to slide the finger over the interface so as to arrive at another final point on the interface; the method can indicate the various possible options of the revision on the said final point.

The trajectory being optionally independent of the flight plan (the creation of a "waypoint" in the "FPLN" structure is not compulsory), the computed trajectory can be continually recomputed as a function of the changes in computation assumptions (for example as a function of the speed of the aircraft, which may change after the initial computation), in particular so as to comply with the "flyability" conditions.

In one embodiment (for example configurable by the aircraft manufacturer or the operator via a configuration file for example or else via a selection by the pilot and/or the airline), it is possible to render the trajectory or a trajectory portion "fixed" once this latter trajectory or trajectory portion has been computed. In this case, the trajectory is "geometrically frozen", i.e. is not necessarily flyable by the craft, having regard to its flight qualities (turning ability in particular). In this case, it is possible to forewarn the pilot that the portion in question cannot be flown. In which case, by simple brushing of the segment concerned, the method can make it possible to recompute and redraw a flyable lateral trajectory.

The present invention will advantageously be implemented in a large variety of avionic environments, in particular on MMIs of CDS (Cockpit Display Systems) type, FMSs, onboard or ground missions systems for piloted aircraft or drones, EFBs (Electronic Flight Bags) or touch tablets. It can also be used with an onboard taxiing system (termed TAXI or ANF for Airport Navigation Function), to define the ground trajectory between fixed elements (points) of the airport surface. The invention can also apply to the maritime or road context.

BRIEF DESCRIPTION OF THE DRAWINGS

Various aspects and advantages of the invention will become apparent in support of the description of a preferred but nonlimiting mode of implementation of the invention, with reference to the figures hereinbelow.

DETAILED DESCRIPTION

Figure 1:
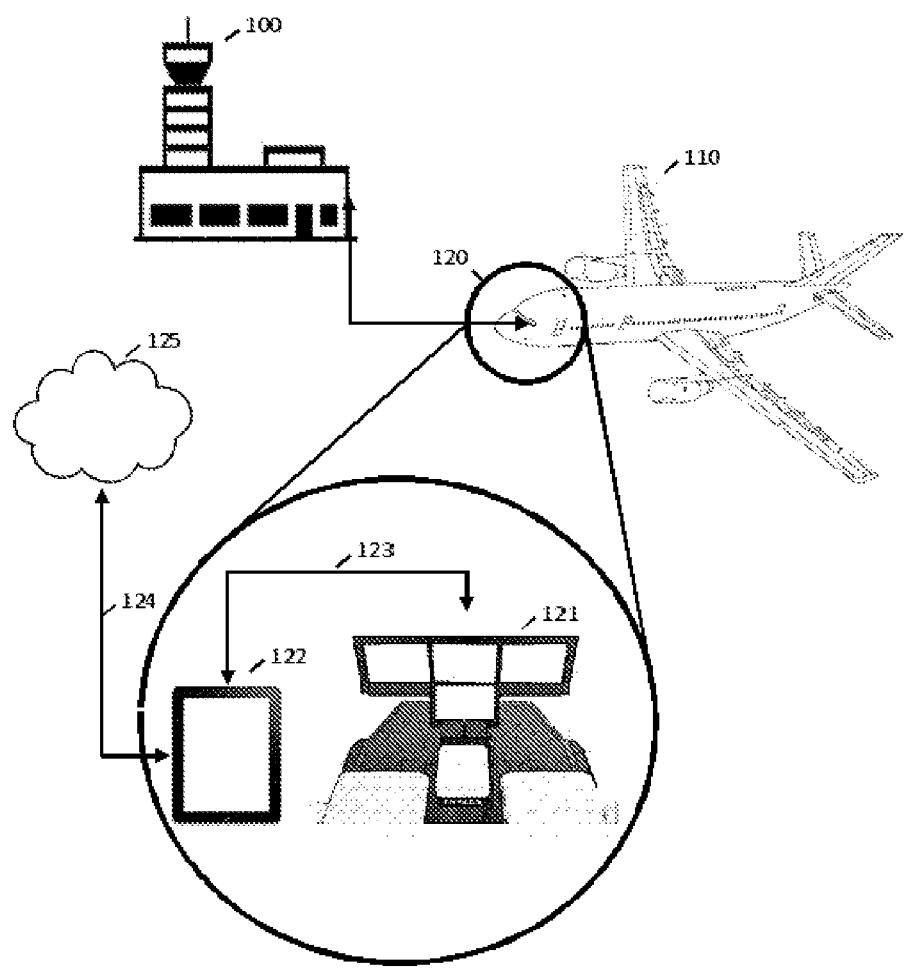
FIG. 1 illustrates the overall technical environment of the invention.

Certain technical terms and environments are defined hereinafter.

The acronym (or initials) FMS corresponds to the conventional terminology "Flight Management System" and designates the flight management systems of aircraft, known in the state of the art through the international standard ARINC 702. During the preparation of a flight or during a rerouting, the crew undertakes the inputting of various items of information relating to the progress of the flight, typically by using an FMS aircraft flight management device. An FMS comprises input means and display means, as well as computation means. An operator, for example the pilot or the copilot, can input via the input means information such as RTAs, or "waypoints", associated with route points, that is to say points vertically in line with which the aircraft must pass. These elements are known in the state of the art through the international standard ARINC 424. The computation means make it possible notably to compute, on the basis of the flight plan comprising the list of waypoints, the trajectory of the aircraft, as a function of the geometry between the waypoints and/or altitude and speed conditions.

Hereinafter in the document, the acronym FMD is used to designate the textual display of the FMS present in the cockpit, generally disposed head-down (at the level of the pilot's knees). The FMD is organized into "pages" which are functional groupings of coherent information. Among these pages feature the "FPLN" page which presents the list of elements of the flight plan (waypoints, markers, pseudo waypoints) and the "DUPLICATE" page which presents the results of the navigation database searches.

The acronym ND is used to designate the graphical display of the FMS present in the cockpit, generally disposed at head level, i.e. in front of the face. This display is defined by a reference point (centred or at the bottom of the display) and a range, defining the size of the display zone.

The acronym MMI corresponds to Man-Machine Interface (or HMI, Human Machine Interface). The inputting of the information, and the display of the information input or computed by the display means, constitute such a man-machine interface. With known devices of FMS type, when the operator inputs a route point, he does so via a dedicated display displayed by the display means. This display may optionally also display information relating to the temporal situation of the aircraft in relation to the route point considered. The operator can then input and view a time constraint imposed for this route point. Generally, the MMI means allow the inputting and the consultation of the flight plan information.

According to one aspect of the invention, the integration of the trajectory computations of the FMS within the present solution is fundamentally difficult to implement, for mathematical reasons. The nesting of computation loops for the computation of trajectories by the FMS culminates in a total computation time which is hardly compatible with the requirements linked with a real-time local deformation of the trajectory (except by having sufficient computation capabilities). In an avionics environment comprising limitations, the invention discloses process steps and systems for marrying these contrary requirements (fast and faithful trajectory viewing validated by limited avionics means).

As a reminder, a "conventional" trajectory computation by the FMS is organized as detailed hereinafter. There is firstly undertaken the computation of a lateral trajectory, assumed to have no turns. Computed thereafter are the predictions on this lateral trajectory, by propagation of the equations of flight mechanics. Recomputed thereafter is the lateral trajectory, with turns, based on the predicted transit speeds at the various waypoints of the flight plan. The predictions on this refined trajectory are recomputed. At output are therefore obtained a) a lateral trajectory portion "Portion_TRAJ" characterized by its departure and arrival positions (in lat/long for example) and curvilinear abscissa with respect to the destination (abscissa of the departure point on the TRAJ_primary: DtD_prim_dep; abscissa of the arrival point on the TRAJ_primary DtD_prim_arr) at the current deformation point (in lat/long for example); b) a succession of segments (straights and turns) between the departure position and that of arrival (in lat/long for the ends of straight segments, and in lat/long aperture of the centre and radius for the circular arcs, for example). The HMI dispatches this new lateral trajectory portion "Portion_TRAJ" in parallel with the primary TRAJ. The current FMSs all perform a complete computation of the Portion_TRAJ, starting from the current position and terminating on the last point of the flight plan (generally the destination).

The main defects of such an existing approach reside on the one hand in the necessity to develop an algorithm for each computation, and on the other hand in the nesting of several iterative loops that are necessary for the determination of this trajectory. Indeed, the computation of the lateral trajectory needs the speed GS given by $R \tan(phi)=GS^2/2$ (where phi is the angle of roll), determined by vertical integration (provided by the known equations $Fz=mg \cdot \cos \gamma$; $Fz=\frac{1}{2}\rho \cdot S \cdot Vair2.Cz$; $Fx=\frac{1}{2}\rho.S.Vair2.Cx$; $Cx=f(Cz)$; $Cx=f(Cx\_smooth; Cx\_conf(i)$ with $i=1 \ldots Nconf; Cx\_m)$; $dx/dt=GS \cdot \cos \gamma$, and $dz/dt=GS \cdot \sin \gamma$, wherein m is the mass, $\gamma$ is the aerodynamic slope, $\rho$ is the density of the air, S the aerodynamic surface area, V is the ground speed (V=GS), Tx is the thrust, Fx is the drag, Fz is the lift, Cz is the lift coefficient and Cx is the drag coefficient. The length of the lateral trajectory and the size of the turns depends on the vertical trajectory. The equations for the vertical are effected along the trajectory computed by the equation $R \cdot \tan(phi)=GS^2/2 \, g$. The vertical trajectory depends on the lateral trajectory.

These interdependencies introduce inaccuracy or indeed instability into the computations since the iterative stringing together of interdependent computations must stop at one moment or another so as to satisfy the computation time requirements, although the convergence between these separate computations is not necessarily achieved. The iterative computations between the lateral and vertical trajectory are necessarily done starting from the initial position as for any differential equation.

The computation time required by the FMS is therefore generally incompatible with the requirements linked with a real-time local deformation of the trajectory. Current FMS systems, having regard to the complexity of the equations hereinabove and the technologies, take between 1 and 30 seconds to compute a final trajectory (i.e. lateral+vertical with a convergence in the computations), just where between 60 ms and 200 ms is needed in order to follow a finger moving on a screen without the eye noticing any latency. The impact of a deformation of the lateral trajectory of itself has impacts on the vertical trajectory (since the constrained points are no longer in the same place etc.), itself feeding back into impacts on the lateral trajectory.

According to one aspect of the invention, there is performed a new type of fast lateral/vertical computation, whose computation time is dependent on the speed of displacement of the finger. The trajectory will be of less good quality if the finger moves rapidly, but this is acceptable for the eye; what matters is that the trajectory is "of better quality" when the finger slows down when arriving at the target point.

FIG. 1 illustrates the overall technical environment of the invention. Avionics equipment or airport means 100 (for example a control tower linked with the air traffic control systems) are in communication with an aircraft 110. An aircraft is a means of transport capable of deploying within the terrestrial atmosphere. For example, an aircraft can be an aeroplane or a helicopter (or else a drone). The aircraft comprises a flight cabin or a cockpit 120. Within the cockpit are situated piloting equipment 121 (so-called avionics equipment), comprising for example one or more onboard computers (means of computation, storage and saving of data), including an FMS, means of display or of viewing and inputting of data, means of communication, as well as (optionally) means of haptic feedback and a taxiing computer. A touch tablet or an EFB 122 may be found on board, in a portable manner or integrated into the cockpit. The said EFB can interact (bilateral communication 123) with the avionics equipment 121. The EFB can also be in communication 124 with external computing resources, accessible through the network (for example "cloud computing" 125). In particular, the computations can be performed locally on the EFB or in a partial or total manner in the means of computation accessible through the network. The onboard equipment 121 is generally certified and regulated while the EFB 122 and the connected computerized means 125 are generally not (or to a lesser extent). This architecture makes it possible to inject flexibility on the EFB 122 side while ensuring controlled safety on the onboard avionics 121 side.

Among the onboard equipment are various screens. The ND screens (graphical display associated with the FMS) are generally disposed in the primary field of view, at "head-level", whilst the FMDs are positioned "head-down". All the information entered or computed by the FMS is grouped together on so-called FMD pages. Existing systems make it possible to navigate from page to page, but the size of the screens and the necessity not to place too much information on a page for its readability do not allow an overview of the entire current and future situation of the flight. The flight cabin crews of modern aircraft generally consist of two people, distributed on either side of the cabin: a "pilot" side and a "copilot" side. Business aircraft sometimes have only a pilot, and certain older or military transport aircraft have a crew of three people. Each views on their MMI the pages of interest to them. Two pages out of the hundred or so possible are generally displayed continually during the execution of the mission: the "flight plan" page first, which contains the information about the route followed by the aircraft (list of the next waypoints with their associated predictions in terms of distance, time, altitude, speed, fuel, wind). The route is divided into procedures, themselves consisting of points (as described by patent FR2910678) and the "performance" page thereafter, which contains the useful parameters for guiding the aircraft over the short term (speed to be followed, altitude ceilings, next changes of altitude). There also exists a multitude of other pages available onboard (the lateral and vertical revision pages, the information pages, pages specific to certain aircraft), i.e. generally a hundred or so pages.

Figure 2:
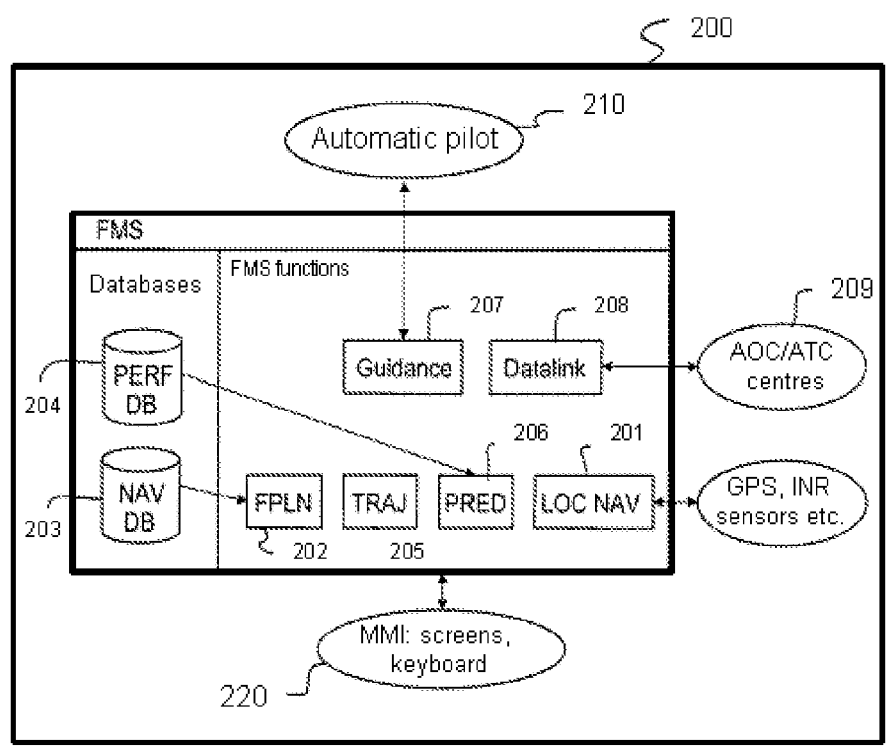
FIG. 2 schematically illustrates the structure and the functions of a flight management system of known FMS type.

FIG. 2 schematically illustrates the structure and the functions of a flight management system of known FMS type. A system of FMS type 200 disposed in the cockpit 120 and the avionics means 121 has a man-machine interface 220 comprising input means, for example formed by a keyboard, and display means, for example formed by a display screen, or else simply a touch-sensitive display screen, as well as at least the following functions:

Navigation (LOCNAV) 201, for performing optimal location of the aircraft as a function of the geolocation means such as geo-positioning by satellite or GPS, GALILEO, VHF radionavigation beacons, inertial platforms. This module communicates with the aforementioned geolocation devices;

Flight plan (FPLN) 202, for inputting the geographical elements constituting the "skeleton" of the route to be followed, such as the points imposed by the departure and arrival procedures, the route points, the air corridors, commonly referred to as "airways". An FMS generally hosts several flight plans (the so-called "Active" flight plan on which the aircraft is guided, the "temporary" flight plan making it possible to perform modifications without activating the guidance on this flight plan and "inactive" (so-called "secondary") work flight plans;

Navigation database (NAVDB) 203, for constructing geographical routes and procedures on the basis of data included in the bases relating to the points, beacons, interception or altitude legs, etc.;

Performance database, (PERFDB) 204, containing the craft's aerodynamic and engine parameters;

Lateral trajectory (TRAJ) 205, for constructing a continuous trajectory on the basis of the points of the flight plan, complying with the performance of the aircraft and the confinement constraints (RNAV for Area Navigation or RNP for Required Navigation Performance); The lateral trajectory TRAJ is therefore the continuous thread which links the various elements of the flight plan FPLN, according to geometry rules defined by the international standard AEEC ARINC 424. The geometry rules pertain to the elements of the flight plan, which are extracted from the database NAVDB;

Predictions (PRED) 206, for constructing a vertical profile optimized on the lateral and vertical trajectory and giving the estimations of distance, time, altitude, speed, fuel and wind notably over each point, at each change of piloting parameter and at the destination, and which will be displayed to the crew. The methods and systems described affect or relate to this part of the computer;

Guidance (GUID) 207, for guiding the aircraft in the lateral and vertical planes on its three-dimensional trajectory, while optimizing its speed, with the aid of the information computed by the Predictions function 206. In an aircraft equipped with an automatic piloting device 210, the latter can exchange information with the guidance module 207;

Digital data link (DATALINK) 208 for exchanging flight information between the Flight plan/Predictions functions and the control centres or other aircraft 209;

one or more MMI screens 220. All the information entered or computed by the FMS is grouped together on display screens (FMD, NTD and PFD, HUD pages or the like). On A320 or A380 type airliners, the trajectory of the FMS is displayed at head level, on a so-called Navigation Display (ND) display screen. The "Navigation display"

offers a geographical picture of the situation of the aircraft, with the display of a cartographic background (whose exact nature, whose appearance and whose content may vary), sometimes together with the flight plan of the aircraft, the characteristic points of the mission (equi-time point, end of climb, start of descent, etc.), the surrounding traffic, the weather in its diverse aspects such as winds, storms, zones of freezing conditions, etc. On aircraft of the A320, A330, A340, B737/747 generation, there is no interactivity with the flight plan display screen. The construction of the flight plan is done using an alphanumeric keyboard on a so-called MCDU (Multi Purpose Control Display) interface. The flight plan is constructed by inputting the list of waypoints represented in tabular form. It is possible to input a certain amount of information about these "waypoints", via the keyboard, such as the constraints (speed, altitude) that must be complied with by the aircraft on passing the waypoints. This solution presents several defects. It does not make it possible to deform the trajectory directly, since the latter is computed by the system in accordance with the geometry rules of AEEC ARINC 424: it is necessary to undertake a successive inputting of "waypoints", which either exist in the navigation databases (NAVDB standardized onboard in the AEEC ARINC 424 format), or are created by the crew via its MCDU (by inputting coordinates for example). This process is tedious and inaccurate having regard to the size of current display screens and their resolution. For each modification (for example a deformation of the trajectory to avoid a dangerous weather vagary, which is moving), it is necessary to re-input a succession of waypoints outside of the zone in question.

Figure 3:
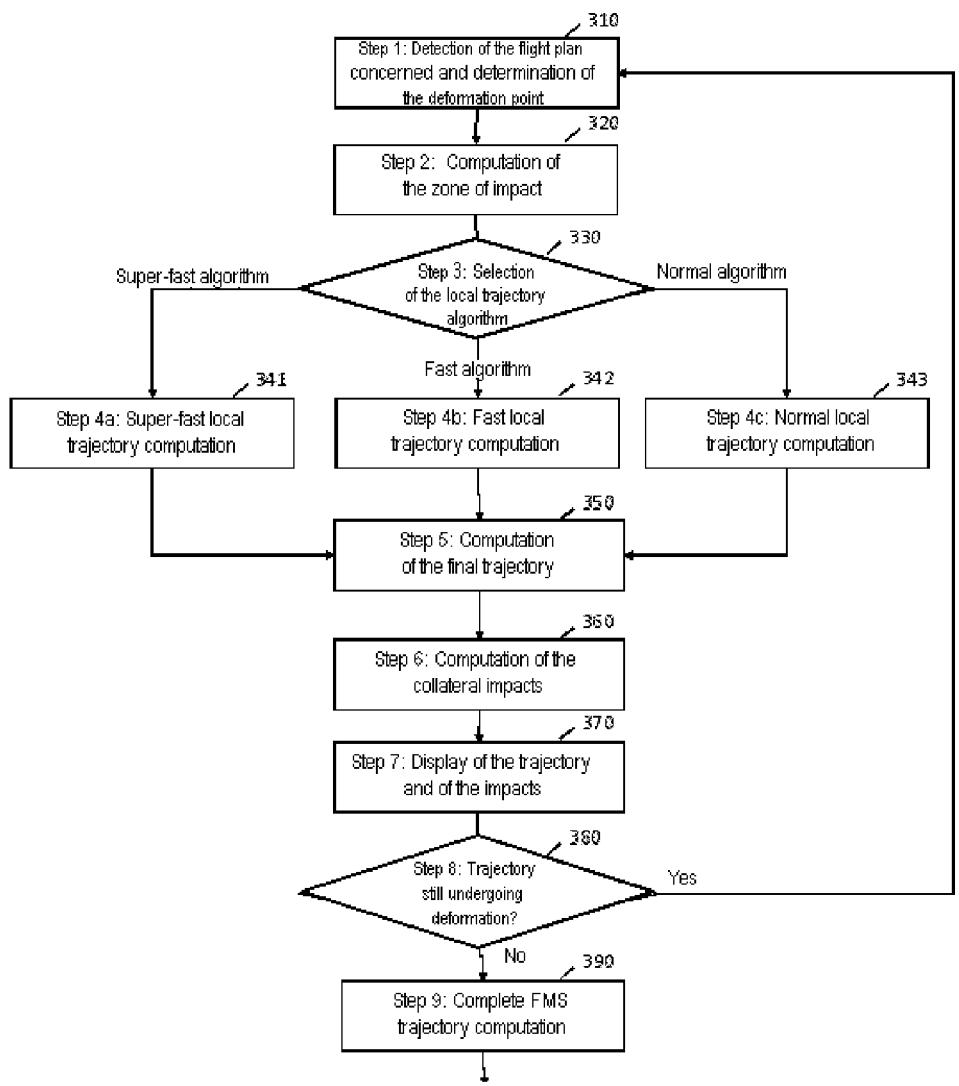
FIG. 3 presents examples of steps according to a method of the invention.

FIG. 3 presents examples of steps according to the method of the invention.

A method according to the invention is in particular based on the computation of trajectory and prediction of the FMS and performs one or more of the steps detailed hereinafter.

In a first step 310, the method according to the invention determines the flight plan concerned and the deformation point (pressing point of the finger or of the pointing device, or indeed optionally displacement of the hand or of the eye or of a contactless pointing device "Air Touch concept"). In particular, the deformation point is not necessarily a "point of the flight plan". This allows successive trajectory modifications to be made, independently of the flight plan structure. Indeed, after a first trajectory modification, it is possible to desire to perform a local modification on the deformed trajectory. In order for this to be possible, it is necessary not to tie the algorithm to the flight plan points. The "current deformation point" corresponds to the current position of the finger on the screen.

In a second step 320, the method determines a zone of impact on the primary TRAJ, dependent on the position of the deformation point. This zone determines the bounds between which the computation of new trajectory will be performed. Nominally, the zone is situated between the two points bracketing the deformation point. When the pilot displaces the deformation point in space, the system will compute 2 points for rejoining the TRAJ_PRIMARY trajectory, both situated respectively on the segments [previous point, initial deformation point on the trajectory], [initial deformation point on the trajectory, next point]. The rejoining angle can be parametrized by the pilot, with a default value of 45°. If an interception point (which will hereinafter be called the "departure point" or the "arrival point") reaches one of the 2 bounds of the segment on which it is defined, then the point is deleted, since it is not needed. In a preferred embodiment, the two points ("previous point" and "next point") bracketing the deformation point are the "flight plan points" preceding and following the deformation point. The "deformation point" is also computed and stored in the guise of "flight plan point". In an alternative, the method is independent of the "flight plan points": it does not create any "flight plan points", but solely known "trajectory points" of the trajectory (in the FMS sense, see §1.11). However, on the initialization of the first deformation, knowing that the basis is a TRAJ_primary lateral trajectory which is constructed on the flight plan, the "next point" is a "flight plan point". If the deformation point is on the "active leg" (i.e. the current trajectory segment between the aircraft and the 1st flight plan point), the method defines the "previous point" as being the current position of the aircraft. Otherwise this is a "flight plan point": this is valid only for the 1st deformation. The zone of impact is modelled by the existence (or indeed 0 as the case may be) of two points along the initial trajectory (hereinafter called "departure point" and "arrival point") each situated respectively between [previous point; the deformation point] and [the deformation point; next point]. If there is no "flight plan" point in proximity to the deformation point, the zone of impact corresponds to a distance along the trajectory, on either side of the deformation point, dependent on the remoteness of the deformation point with respect to the primary trajectory TRAJ. When the flight plan does not comprise any "flight plan points" close to the deformation zone, this embodiment avoids a deformation which starts from too far away.

In a third step 330, the method selects the type of computation to be performed. The type of computation to be performed may in particular be dependent on the speed of displacement of the finger (ultra-fast, fast, normal etc.). To model the speed of displacement of the finger, the speed of displacement may for example be evaluated as a percentage of the range of display on the screen (display scale) or independently of this range of display, it is possible to undertake a selection by percentage elongation (by how much the new selection with the finger causes the lateral trajectory to lengthen). In this way are launched computations as a function of the movements made by the pilot, reflecting the perception expected by him. One of the objectives of an embodiment of the invention is to provide a result "under the finger" which is close to the final reality and whatever the deformation of the trajectory. For example, if the displacement of the finger corresponds to an elongation of the trajectory of more than X1% with respect to the previous computation, then the so-called "ultra-fast" algorithm can be selected. By default, for example if the displacement of the finger corresponds to an elongation of the trajectory of between X2% and X1% with respect to the previous computation, then the so-called "fast" algorithm will be selected. Still by default, the so-called "normal" algorithm will be selected. These values may moreover be configurable (by default, according to the pilot's preferences, by automatic learning etc.). It is for example possible to fix X1 at 50% and X2 at 10%.

In a fourth step, the method computes a local secondary trajectory passing through the deformation point (or in proximity), in the zone of impact. The existing FMSs are limited to the trajectories starting from the aircraft and in particular do not compute a trajectory portion in the middle of another for example. They always commence the computation at the initial position (first point of the flight plan or aircraft current position, and terminate their computation at the last point of the flight plan (generally the destination). The computations are performed by fast local-trajectorycomputation algorithms optimized as a function of the speed of displacement of the deformation point.

In order for this to be fast, the interface HMI calls a trajectory computation (termed "LIB TRAJ" of computation of the segments), with:

The name of the primary TRAJ: TRAJ of the active, temporary or secondary FPLN, as well as the flight plan portion concerned (primary or "alternate" portion), The reference segment or reference point, called in the first step 1 "initial deformation point,"

The bounds arising from step 2 ("previous point" and "next point"), the position (finger) of the "current deformation point,"

the information about the desired algorithm ("ultra-fast", sub-step 4a), "fast" (PREDS approximate, sub-step 4b), "exact" (TRAJ and PREDS, sub-step 4c).

In detail, step 341 (step 4a) determines the instantaneous trajectory to be displayed to the pilot. Its aim is to minimize to the maximum the response time, by limiting the accuracy of the computation. Accordingly, it is computed as detailed hereinafter. The predictions at the "previous point" and "next point" are firstly retrieved. The mean turning radius equals (mean Ground Speed)$^2$/(g*Tan(angle of roll)), where g is the gravitational constant, with mean Ground Speed=0.5*(previous Ground Speed+following Ground Speed). The angle of roll (for example 25°) is configurable, but for an "ultra-fast" computation, it may be preferable to use either a constant or a simple analytical formula (for example linear as a function of the altitude and/or of the speed for example). The computation of the trajectory can finally be based on this mean turning radius from the "previous point" up to the "next point" (therefore including the two interception waypoints hereinafter called ("departure point" and "arrival point") if they exist and the deformation waypoint.

In detail, step 342 (step 4b) determines the refined trajectory in terms of turning radii to be displayed to the pilot. This time, the pilot having slowed down his displacement, the idea is to display a more accurate trajectory to him, but while retaining a fast response time. Accordingly, the trajectory is computed as detailed hereinafter. The predictions at the "previous point" and "next point" are retrieved. Denoting by VSP and VSS the ground speeds for the "previous point" and "next point", there is undertaken the interpolation of the predictions at the intermediate points: departure point, deformation point, arrival point. Denoting by VS1, VSD and VS2 the respective ground speeds for the "Departure point", Deformation point, "Arrival point", denoting by LP1 the distance separating the "previous point" and "Departure point", denoting by LPD the distance separating the "previous point" and Deformation Point, passing through the "Departure point", denoting by LP2 the distance separating the "previous point" and the "Arrival point", passing through "Departure point" and Deformation, denoting by LPS the distance separating the "previous point" and "next point", passing through the 3 intermediate points, are obtained:

$$VS1=VSP+LP1/LPS*(VSS-VSP)$$

$$VSD=VSP+LPD/LPS*(VSS-VSP)$$

$$VS2=VSP+LP2/LPS*(VSS-VSP).$$

The coherent turning radius of these predictions at each of the points (potentially up to 5 different radii) can be computed. Consider i belonging to [Previous Point, "departure point", Deformation, "arrival point", Next Point], then the turning radius i equals (VSi)$^2$/(g*Tan(25°)) (the 25° are configurable and can be of a form f(altitude, speed, engine state). Computed thereafter is the trajectory based on these various turning radii from the "previous point" up to the "next point".

In detail, step 343 (step 4c) determines the "exact" trajectory (in terms of lateral segments and predictions) to be displayed to the pilot. This time, the pilot has greatly slowed down his displacement. By construction, the deformation point is considered to be close to its final position. Consequently, the system will try to compute the most exact possible trajectory so as to propose to the pilot the most representative possible trajectory of the final version. Accordingly the trajectory is computed in a conventional manner but instead of beginning from the aircraft, it begins from the "previous point". In this manner, the error in terms of predictions is greatly minimized. The computation stops at the "next point", as for steps 4a and 4b.

As an option, the display can be specific so as to identify the part of the trajectory impacted by the command. For example, the impacted trajectory can be displayed with blue dots (or in the colour of the modified flight plan) above the already displayed trajectories.

This manipulation could be visible only on the side where the operation is carried out, entailing a rough sketch constructed physically with the finger by the pilot or the copilot. This makes it possible to avoid problems of synchronization or understanding by the algorithm, on the other side.

Alternatively, a deactivation of the interactivity on the screens other than the one where the deformation is currently being carried out could be envisaged. In detail, step 350 (step 5) determines a final trajectory, by replacing the primary trajectory by the trajectory "Portion_TRAJ" in the zone of impact (i.e. between the departure and arrival positions of step 3). In one embodiment #1A, the positions of the "departure and arrival points" are stored in the guise of "point of the flight plan" in the flight plan structure. In one embodiment #1 B, the positions of the "departure and arrival points" are stored in the guise of "point of the trajectory" in the lateral trajectory structure. In one embodiment #2A, the deformation point is stored in the guise of "point of the flight plan" in the flight plan structure. In one embodiment #2B, the deformation point is stored in the guise of "point of the trajectory" in the lateral trajectory structure. Optionally, the embodiments (#1A or #2A) and (#2A or #2B) can be (interchangeably) combined (for example #1A with #2B). A trajectory discontinuity may appear between the end of the computed trajectory and the origin trajectory which follows. This is not the case at the start of the computed trajectory seeing that the latter starts from the original trajectory. To solve this problem a sub-step can if necessary determine the rest of the trajectory so as to ensure the continuity (and therefore the flyability) of the trajectory computed by the system. Accordingly, the system can perform a conventional trajectory computation, waypoint by waypoint (beginning with the following waypoint) until this discontinuity is removed. This step can take some time but generally remains acceptable, because nominally it is not necessary. Moreover, operationally, the waypoints are sufficiently spaced as not to propagate a discontinuity during several waypoints. In fact, this step may amount in almost all cases to the principle "no extra computation necessary" or "computation of a single additional waypoint". At output, a final trajectory is therefore available, where each element is referenced for example by curvilinear abscissa with respect to the destination (called "Dist to Dest" or "DtD"). The departure and arrival points and the deformation point can therefore be located on the TRAJ_final by their DtD: Departure point (DtD_final_dep), arrival point (DtD_final_arr), deformation point (DtD_final_defor).

In the detail of the sixth step 360, the method determines the impacts on the predictions of the replacement of the primary trajectory portion by the secondary trajectory in the zone of impact. To this end, the method retrieves in the TRAJ_primary trajectory, the predicted data on a) the closest lateral trajectory element, situated upstream of the "departure point" (named "previous point" hereinabove); this process is more accurate than taking the departure and arrival points of step 5, on b) the abscissa of the point close to the departure point DtD_prox_dep, on c) the speed of the point close to the departure point V_prox_dep, on d) the altitude of the point close to the departure point Alt_prox_dep, on e) the time of the point close to the departure point T_prox_dep, on f) the fuel of the point close to the departure point Fuel_prox_dep, on g) the wind of the point close to the departure point Wind_prox_dep, on h) the closest lateral trajectory element, situated downstream of the "arrival point" (named "next point" hereinabove), on i) the abscissa of the point close to the arrival point DtD_prox_arr, on j) the speed of the point close to the arrival point V_prox_arr, on k) the altitude of the point close to the arrival point Alt_prox_arr, on l) the time of the point close to the departure point T_prox_arr, on m) the fuel of the point close to the arrival point Fuel_prox_arr, on n) the wind of the point close to the arrival point Wind_prox_arr.

Next the method determines the trajectory elongation between the primary trajectory TRAJ and the final trajectory TRAJ by means of the Elongation equality K=(DtD_final_dep−DtD_final_arr)/(DtD_prim_dep−DtD_prim_arr). Thereafter, the method computes the impact on the predictions of the flight plan points concerned in the modification, that is to say of the points subsequent to the deformation point, as a function of the desired algorithm ("ultra-fast", "fast" or "exact") according to the modalities described hereinafter in respect of the example.

For the so-called "ultra-fast" algorithm are for example computed the time over the "next point" given by T_prox_dep+K*(T_prox_arr−T_prox_dep) and the time upon arrival, by applying the temporal offset K*(T_prox_arr−T_prox_dep) to the predicted arrival time of the TRAJ_primary. The temporal offset K*(T_prox_arr−T_prox_dep) can also be applied to all the flight plan points which follow the "point prox_dep", including the deformation point. The fuel on the next point is given by Fuel_prox_dep+K*(Fuel_prox_arr−Fuel_prox_dep). The computation is repeated for all the points up to arrival (the fuel offset is applied). The other parameters can be computed in the same manner, though of lesser importance. The objective for the pilot and the crew is to ascertain the impact on the deformation point and the end point as well as the destination.

For the so-called "fast" algorithm, in order to compute the time over the "next point" in a more accurate manner, the speed can be smoothed over the segment stretched between the elements "previous point" and "next point", for example with a linear evolution of the speed. Denoting by d the distance between a point of the trajectory segment between "previous point" and "next point", i.e. d=0 at the "previous point" and d=DtD_prox_arr−DtD_prox_dep at the "next point". The time taken to traverse the new trajectory can be modelled by a linear variation of the speed, for example given by the equality V(t)=V_prox_dep+(t−T_prox_dep)*(V_prox_arr−V_prox_dep)/(T_prox_arr−T_prox_dep). By integrating x(t)=integral(V(t)dt) between T_prox_dep and T_prox_arr, we obtain d=(V_prox_dep+V_prox_arr)x(T_prox_arr−T_prox_dep)/2. Thus T_prox_arr−T_prox_dep=2d/(V_prox_dep+V_prox_arr). The Fuel consumed can be computed in the same manner as in the case of the "ultra-fast" process, or else by measuring the rate FF at the "previous point" and "next point", and then by integrating it between T_prox_dep and T_prox_arr according to a linear law. A formula of the type Fuel_prox_arr−Fuel_prox_dep=2(T_prox_arr−T_prox_dep)/(FF_prox_dep+FF_prox_arr) is obtained by a computation similar to that hereinabove.

In the case of the so-called "normal" algorithm, there is no need for additional computations. The feedback, described in step 4c, between trajectory and predictions gives the correct predictions at the waypoints directly, doing so up to arrival.

In the detail of the seventh step 370, the method displays the final trajectory on the interactive screen. If the modification took place on an active flight plan, this created a temporary flight plan, which it is necessary to choose whether or not to insert through the existing commands. In one alternative, it is possible to remain in the active flight plan rather than to create a temporary one. If the modification is made on a secondary flight plan, it can be applied to the flight plan without passing through a temporary state. In all cases, a button or an actuator can make it possible to accept/refuse the deformation, if necessary.

In the detail of the eighth step 380, the method determines whether the trajectory is still being modified. This step for example checks whether the finger is still in contact with the screen, under the trajectory, and if it moves by at least X3% (for example by 1% with respect to the previous touch). If it is no longer moving (but remains pressed for example), the eighth step continues. If the pilot's finger continues to move over the interface, the computation is relaunched at step 1.

In a particular case corresponding to the cancellation of the revision, a cancellation of the command can be requested if the deformation point is brought back onto the primary trajectory TRAJ (the method deduces therefrom that there is no longer any deformation and cancels the revision). If the finger is raised up, it can be considered that the deformation has terminated, and the method then passes to the following step.

In an alternative embodiment, it is possible to shift the deformation point more finely through short presses alongside this deformation point. If appropriate, the shift may for example be performed on the straight line which passes through the initial position of the deformation point and its current position. In this alternative, the act of raising the finger may not terminate the command. A third party graphical means (confirm/cancel button) may for example make it possible to terminate this command intentionally.

In the detail of the ninth step 390, the method performs the "complete computation". When the finger has quit the screen and a final trajectory TRAJ has been computed (through the following steps), the trajectory is computed by the FMS conventional means.

In certain embodiments, the cancellation of the command may remain possible, for example by selection of specific 'UNDO' or 'ERASE' buttons of the FMS. Once the trajectory has been validated, it may for example be possible to cancel the command by selecting the deformation point or a segment belonging to the zone of impact, and then by launching the new command Fit_FPLN which makes it possible to return to a trajectory computation based on the flight plan. This option offers the possibility of doing "What ifs", that is to say of testing alternative solutions: the pilot may for example deform the trajectory so as to avoid a geographical zone (e.g. unfavourable weather) but ultimately realizes that the result is no better.

Graphically, that is to say in its visual rendition, the proposed system may make it possible to distinguish the display of the trajectory computed on the basis of the flight plan (i.e. that corresponding to the conventional computation) from that modified by the pilot by means of the method according to the invention. In one embodiment, the segments of the trajectory are displayed with double lines. This signalling makes it possible to indicate to the pilot where he can act so as to return to a trajectory computed on the flight plan (Fit_FPLN command).

Figure 4:
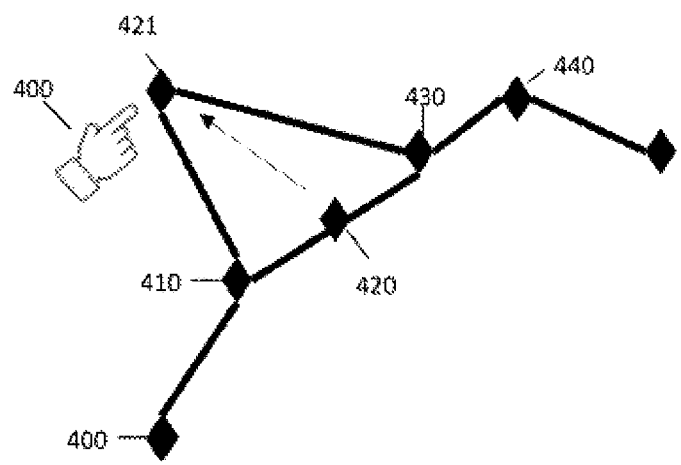
FIG. 4 illustrates an example of trajectory manipulation on a touch-sensitive interface and shows in particular the determination of a zone of impact.

FIG. 4 illustrates an exemplary interface for the deformation of the trajectory of the aircraft.

In one embodiment, the trajectory of the aircraft is displayed and then modified through gestures or movements of the pilot. In this instance, on a touch-sensitive interface, the pilot's finger selects a deformation point, maintains a "pressure" (e.g. does not take the finger off the interface or maintains a pressure if the touchscreen is sensitive to pressure) and slides the said point towards a location of the display at the pilot's discretion. The pilot modifies the trajectory by placing his finger on a point of the trajectory, and then "slides" his finger over the screen until it is validated, either by reaching a desired element, or by removing the finger from the screen, as illustrated by the following FIG. 5.

A particular example of touch-sensitive interactivity may therefore follow the following sequence illustrated in FIG. 4: the pilot places his finger on a point and then selects an action in the dialogue box which then opens on the screen, here so as to displace the said point. The pilot thereafter slides his finger to the left to deform the trajectory. The pilot continues to slide his finger to the left so as to deform the trajectory but this deformation may not follow (i.e. the underlying display does not correspond to the touch instructions on the surface), for example having regard to the response time of the FMS (which computes the trajectory in the background). The pilots then waits, his finger still pressed, until the trajectory displayed (validated by the FMS) "reaches" his stationary finger and can allow him to validate the new trajectory thus defined (by tapping for example). When the command is dispatched to the FMS flight computer, the latter computes a "true" trajectory, which may not correspond exactly to the trajectory interactively drawn with the finger (for example having regard to the internal complex algorithms for managing the continuity of the flight and turns). Stated otherwise, in the state of the art, once the flight plan has been sketched on the interface and validated on this same interface, the FMS flight computer computes a trajectory (in red) which does not necessarily correspond to the trajectory perceived or displayed initially (in green).

According to the invention, various embodiments (i.e. various modes of display or variants) can be implemented. According to a first mode, display and validation coincide. Visually, only a trajectory at first sight validated by the FMS computer can be displayed, whether this was at the price of a latency time between the finger command and the actual display of the modified trajectory. In a second mode, display and validation are asynchronous. For example, display begins by following the finger command, and then during validation by the FMS the real trajectory is displayed (possible differences can be indicated by means of colour codes or by dots or other graphical effects), therefore with a latency time between the desired trajectory drawn and the trajectory validated and displayed subsequently. In other modes, variants can combine these types of graphical effects and/or interactions. For example, various modifications can be pre-computed on the basis of a point selected on the screen (in background, computations may attempt to anticipate various possibilities on the basis solely of the selection of a point on the screen). Trajectories in finite number may be obtained as results of these anticipated computations. The candidate trajectories under the pilot's finger may hence alternate between these various possibilities, reducing the latency times necessary for the validation of the various trajectories. The interaction time is therefore exploited: as soon as the pilot has designated a point of the trajectory, the more time elapses the more alternatives the method computes in background. Optionally, diverse criteria (e.g. scores in regard to fuel savings, gain of flight time and/or mechanical wear, diverse quantifications in regard to safety) may be associated with the various pre-emptive alternatives computed and displayed if appropriate (on request or in fact, according to diverse graphical modalities)

FIG. 4 illustrates an example of trajectory manipulation on a touch-sensitive interface. The figure shows an example of determining the zone of impact. The figure represents a trajectory according to a known flight plan. The pilot selects a point 420 (which is not necessarily a flight plan point (or "waypoint") but which may actually be an arbitrary point belonging to the trajectory) and slides this deformation point towards a target position 421. Two adjacent points forming part of the flight trajectory are then determined, for example the "departure point" 410 and the "arrival point" 430, in the present case with a rejoining angle chosen at 45 degrees. This figure corresponds to the case where the deformation point and the adjacent points are flanked by flight plan points (or "waypoints"), which are delineated by the "previous (flight) point" 400 and the "next (flight) point" 440.

In certain embodiments, the deformation point 420/421 may become a new flight point at the pilot's discretion for example, by intentional input or by confirmation of such an option).

In one embodiment, the determination of the zone of impact may be bounded. For example, if the deformation point has been "dragged" too far so that a rejoining at 45° is possible at the departure point, then specifically the "departure point" can be bounded (that is to say limited or fixed) to the "previous point".

In one embodiment, several points of the trajectory can be edited or manipulated or modified, simultaneously (e.g. "multi-touch") or sequentially. Stated otherwise, a second deformation can be performed on a trajectory that has been deformed a first time. A trajectory can be deformed on the basis of several initial contact points, if at least two fingers are initially placed at two locations of the trajectory. Once again the deformation points may be flight plan points ("waypoints") or trajectory points (i.e. arbitrary).

In a variant embodiment, the pilot designates a "positive" point (or "attractor"), that is to say a point on the screen (or zone or area or surface or volume, regular or irregular, received from outside or input by the pilot) which may be situated off of any planned trajectory but which the pilot desires to bring the aircraft closer to, i.e. reconfigure the trajectories with respect to the said point. For example, without even designating the deformation point 420, the pilot can designate the point 421 from the outset and by appropriate means of interaction designate the said point to the method according to the invention as being a point of one or more candidate alternative trajectories. On the other hand, the pilot can designate "negative" (or "repulsive") points.

Positive or negative (e.g. attractor or repulsive) points can be associated with parameters, such as intensities (predefined and/or configurable). These parameters may for example influence the reconfiguration of the trajectories. For example specifically, the pilot will be able to determine a repulsion (or "negative attraction") zone in case of presence of a zone of meteorological dangers (the intensity of which will be able to be determined automatically or independently, the pilot being in charge for example of geographically delimiting the said zone; or conversely, the parametrization of the zone being received from outside and the pilot assigning at his discretion an influence parameter in respect of the recomputation of the trajectories).

Figure 5:
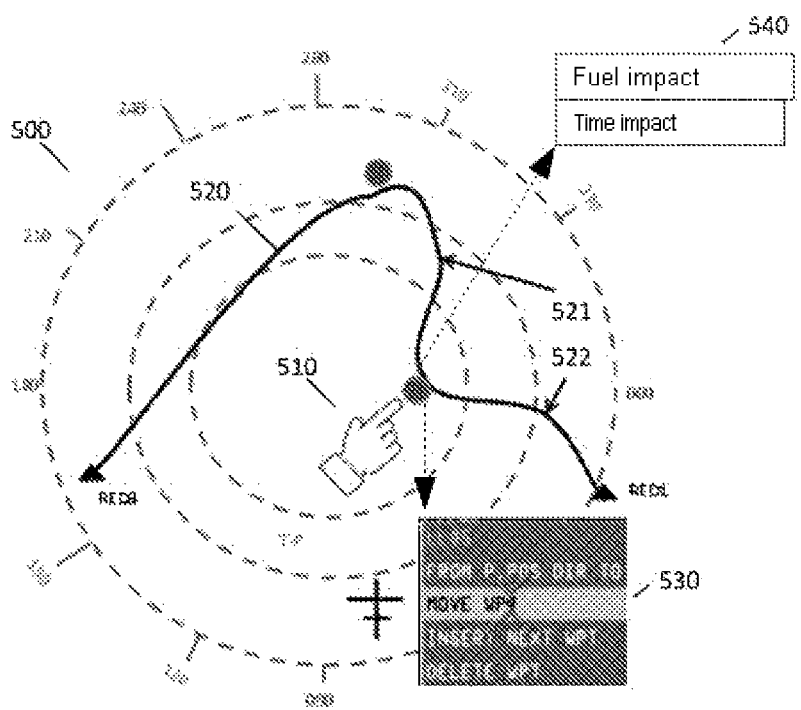
FIG. 5 illustrates an example of display with the Navigation Display ND.

FIG. 5 illustrates an example of display with the Navigation Display ND 500. The pilot enters a command 510 (for example a touch command) for deformation of the current trajectory 520. The modified trajectory results in new segments of trajectories 521 and 522. Depending on whether the algorithms are "super-fast", "fast" or "normal", it will be possible for the said segments to be different (not represented).

Optionally, the designated deformation point 510 can form the subject of extra parametrizations. For example the point selected on the screen can be assigned as new flight plan point (options illustrated by the display of a dialogue box 530). In one embodiment, the options displayed comprise notably an option of recentring the display on the selected point and an option aimed at adding the selected point to the flight plan as new flight plan point.

Still optionally, the impacts in time and/or in fuel 540 which are associated with the modified trajectory can be displayed. The display of other associated parameters can also be implemented (meteorological indicators, safety indicators, etc.).

Figure 6:
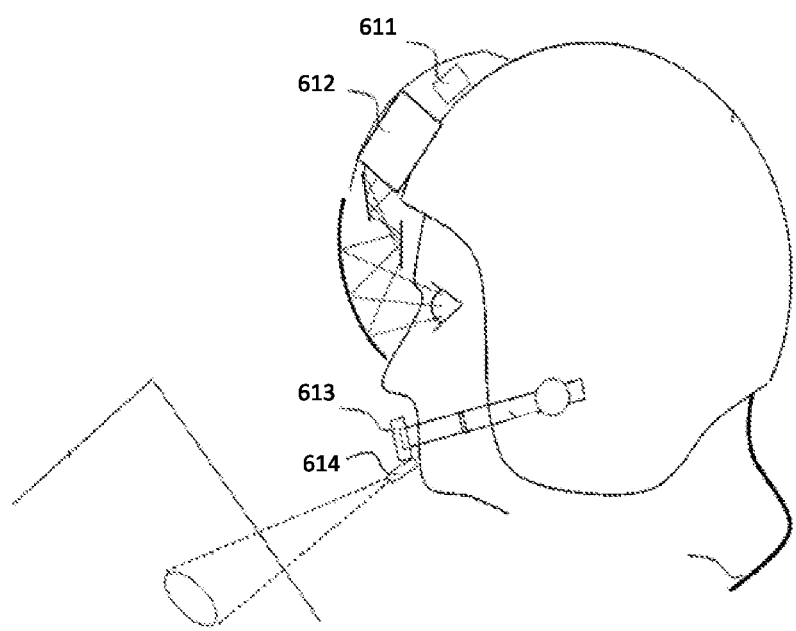
FIG. 6 illustrates various aspects relating to the MMIs for implementing the method according to the invention.

FIG. 6 illustrates various aspects relating to the man-machine interfaces MMI which can be implemented in order to deploy the method according to the invention. As a supplement—or as a substitute—screens of the FMS and/or EFB onboard computer, additional MMI means can be used. Generally, FMS avionics systems (which are systems certified by the air regulator and which may exhibit certain limitations in terms of display and/or ergonomics) may be advantageously complemented with non-avionics means, in particular with advanced MMIs.

In particular, the said man-machine interfaces can make use of virtual and/or augmented reality headsets. The figure shows an opaque virtual reality headset 610 (or a semi-transparent augmented reality headset or a headset with configurable transparency) worn by the pilot. The individual display headset 610 can be a virtual reality (VR) headset, or an augmented reality (AR) headset or a head-up sight, etc. The headset can therefore be a "head-mounted display", a "wearable computer", "glasses" or a video-headset. The headset can comprise computation and communication means 611, projection means 612, audio acquisition means 613 and video acquisition and/or video projection means 614 (for example used for the "scraping" of data accessible in an analogue manner from the cockpit or the flight cabin of the aircraft). In this way, the pilot can—for example by means of voice commands—configure the visualization of the flight plan in three dimensions (3D). The information displayed in the headset 610 can be entirely virtual (displayed in the individual headset), entirely real (for example projected onto the plane surfaces available in the real environment of the cockpit) or a combination of the two (in part a virtual display superimposed or fused with reality and in part a real display via projectors). The display can also be characterized by the application of predefined siting rules and display rules. For example, the man-machine interfaces (or the information) can be "distributed" (segmented into distinct portions, optionally partially redundant, and then apportioned) between the various virtual screens (e.g. 610) or real screens (e.g. FMS, TAXI).

More generally, the management of the man-machine interaction mode according to the invention can be generalized to 3D, that is to say to immersive piloting environments (i.e. three-dimensional spaces). In particular, the control centres for drones can implement such solutions. Augmented reality (AR) and/or virtual reality (VR) environments are emerging rapidly today on the open market (virtual reality headset, wearable computer or glasses, wireless and haptic handles e.g. with force feedback, detection of movements for games consoles, gesture-controlled command peripherals for computers, e.g. "Air Touch", etc.). The tracking of the movements can be performed by means of various technologies, optionally in combination, including: computer vision (estimation of depth), Time-of-Flight camera, head-tracking, depth sensor, accelerometer, gyroscope and others. Specifically, straps can be worn on the wrist, sensors can be inserted into garments, cameras can ensure the detection and tracking of gestures, spectacles or headsets can be worn, external projectors can complement the spatial environments of the user, etc. In such AR/VR environments, the speed and/or the acceleration of the movements of the user in space can also serve in the selection of algorithms. For example, equipped with a data glove and a virtual reality headset, the pilot can manipulate the trajectory in space. In a manner similar to the 2D solution according to the invention, the way in which the pilot manipulates the trajectory in space can determine the downstream computation modes. The correspondence between movements and way of carrying out the computations can be effected according to various models, from the simplest to the most complex (from the analysis of natural body language to gestural codes that can be standardized and learnt by pilots). The 2D and 3D interfaces can supplement one another, optionally. In a simplified and pictorial manner, a pilot chest forwards with fast finger movements on a tablet will trigger fast algorithms whilst the pilot in a relaxed situation and with slow and precise movements will trigger the slowest but the most accurate algorithms.

The various steps of the process can be implemented in all or part on the FMS and/or on one or more EFBs. In a particular embodiment, all the information is displayed on the screens of the FMS alone. In another embodiment, the information associated with the steps of the process is displayed on the onboard EFBs alone. Finally, in another embodiment, the screens of the FMS and of an EFB can be used jointly, for example by "distributing" the information over the various screens of the various items of kit. Spatial distribution of the information performed in an appropriate manner can help to reduce the pilot's cognitive load and hence improve decision taking and increase flight safety.

Concerning the system aspects, certain embodiments are advantageous (for example in regard to ergonomics and as regards the specific possibilities of implementation in existing aircraft cockpits) and are described hereinafter.

Concerning the implementation in the MMI of the FMS, steps 1 to 5 of FIG. 3 can be carried out in the MMI component of the FMS that dialogues on the one hand with the FMS core, and on the other hand with the CDS (display screen). Step 6 can be carried out for example either by the MMI component of the FMS, or by the PRED component of the FMS. Step 7 can be carried out by the MMI component of the FMS (formatting of the lateral trajectory to be displayed, as well as of the corresponding vertical trajectory to be displayed) and of the CDS (physical display of the trajectories on the screen). Step 8 can be carried out by the CDS or by the MMI component of the FMS. Step 9 can be carried out by the TRAJ and PRED components of the FMS.

Concerning the implementation in the CDS (in the display screen), steps 1 to 5 can be carried out in the CDS (display screen). Step 6 can be carried out either by the MMI component of the FMS, or by the PRED component of the FMS. Step 7 can be carried out by the MMI component of the FMS (formatting of the lateral trajectory to be displayed, as well as of the corresponding vertical trajectory to be displayed) and of the CDS (physical display of the trajectories on the screen). Step 8 can be carried out by the CDS or by the MMI component of the FMS. Step 9 can be carried out by the TRAJ and PRED components of the FMS, for example.

Concerning the implementation in the TRAJ and PRED algorithm of the FMS, step 1 can be carried out in the MMI component of the FMS or in the CDS. Steps 2 to 5 can be carried out in the TRAJ component. Step 6 can be carried out either by the MMI component of the FMS, or by the PRED component of the FMS. Step 7 can be carried out by the MMI component of the FMS (formatting of the lateral trajectory to be displayed, as well as of the corresponding vertical trajectory to be displayed) and of the CDS (physical display of the trajectories on the screen). Step 8 can be carried out by the CDS or by the MMI component of the FMS. Step 9 can be carried out by the TRAJ and PRED components of the FMS.

Concerning the implementation distributed according to the necessary speed, it is possible to start from one of the implementations described above, but by varying the component which carries out steps 4 (or indeed steps 4 and 5). Step 4a can be performed in the CDS, step 4b in the MMI of the FMS and step 4c in the TRAJ component of the FMS. The EFB, ANF equipment, TP ground stations and tablets also have an architecture which can be considered to be similar (a display screen, a core processor, and a display manager in the core processor or between the core processor and the display screen), and can therefore receive these same types of implementation.

The present invention can be implemented on the basis of hardware elements and/or software elements. It can be available in the guise of a computer program product on a computer readable medium. The medium can be electronic, magnetic, optical or electromagnetic. The computing means or resources can be distributed ("Cloud computing").

The invention claimed is:

1. A method for a graphical manipulation of a trajectory of an aircraft comprising the steps of:
   receiving an indication of a deformation point associated with the trajectory of the aircraft in a man machine interface;
   determining a zone of local modification of the trajectory of the aircraft as a function of the deformation point with an avionics computer;
   computing a modified trajectory with the avionics computer;
   receiving or determining a parameter associated with the indication of the deformation point with the avionics computer;
   selecting a computation algorithm with the avionics computer from among a plurality of predefined algorithms, said selection being performed as a function of the parameter associated with the indication of the deformation point; and
   graphically restoring said modified trajectory on the man machine interface.

2. The method according to claim 1, the parameter associated with the indication of the deformation point being one of the following: a speed value and an acceleration value.

3. The method according to claim 1, the step of determining the zone of local modification of the trajectory comprising a step of determining bounds of start and end of modification of the trajectory.

4. The method according to claim 1, the modified local trajectory being displayed after a recomputation by the selected algorithm.

5. The method according to claim 1, the selection of the computation algorithm being configurable.

6. The method according to claim 1, further comprising a step of receiving an indication of a final deformation point.

7. The method according to claim 1, further comprising a step of revising the flight plan by adding the final deformation point to the flight plan.

8. The method according to claim 1, the initial deformation point not being a flight plan point.

9. A tangible non-transitory computer program product, comprising code instructions that perform the steps of the method according to claim 1, when the tangible non-transitory computer program is executed on a computer.

10. A system comprising an avionics computer and man machine interface configured to implement the steps of the method according to claim 1.

11. The system according to claim 10, comprising one or more touch-sensitive interfaces present on at least one of the following: a flight computer of a Flight Management System (FMS), one or more Electronic Flight Bags (EFB), and one or more display screens of a Cockpit Display System (CDS).

12. The system according to claim 10, comprising at least one of the following: a navigation display screen of a Navigation Display (ND) and a vertical evolution display screen of a Vertical evolution Display (VD).

13. The system according to claim 10, comprising a device configured to provide at least one of the following: virtual reality and augmented reality.

* * * * *